US007577991B2

(12) United States Patent
Huynh et al.

(10) Patent No.: US 7,577,991 B2
(45) Date of Patent: Aug. 18, 2009

(54) METHOD TO ENHANCE PLATFORM FIRMWARE SECURITY FOR LOGICAL PARTITION DATA PROCESSING SYSTEMS BY DYNAMIC RESTRICTION OF AVAILABLE EXTERNAL INTERFACES

(75) Inventors: Trang N. Huynh, Austin, TX (US); Gordon D. McIntosh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 10/897,228

(22) Filed: Jul. 22, 2004

(65) Prior Publication Data
US 2006/0021033 A1 Jan. 26, 2006

(51) Int. Cl.
*G06F 12/14* (2006.01)
*G06F 9/26* (2006.01)
*G06F 9/46* (2006.01)

(52) U.S. Cl. .......................... 726/22; 726/25; 711/200; 717/121

(58) Field of Classification Search ................ 726/25, 726/22; 711/200; 717/121
See application file for complete search history.

(56) References Cited

U.S. PATENT DOCUMENTS

| 6,279,046 | B1 * | 8/2001 | Armstrong et al. ............. 710/5 |
| 6,678,825 | B1 * | 1/2004 | Ellison et al. ................. 726/17 |
| 6,691,146 | B1 * | 2/2004 | Armstrong et al. .......... 718/100 |
| 7,058,768 | B2 * | 6/2006 | Willman et al. ............. 711/154 |
| 7,076,802 | B2 * | 7/2006 | Poisner ........................ 726/22 |
| 2003/0009648 | A1 | 1/2003 | Doing et al. |
| 2005/0216759 | A1 * | 9/2005 | Rothman et al. ............. 713/200 |
| 2005/0273856 | A1 * | 12/2005 | Huddleston .................. 726/22 |
| 2006/0004944 | A1 * | 1/2006 | Vij et al. ........................ 711/6 |
| 2006/0031933 | A1 * | 2/2006 | Costa et al. .................... 726/22 |

OTHER PUBLICATIONS

"Logical Partition Security in the IBM eserver pSeries 690", Online!, Feb. 2002, XP002340298, http://www-O3.ibm.com/servers/eserver/pseries/hardware/whitepapers/1 par security.pdf.*

"Logical Partition Security in the IBM eserver pSeries 690", Online!, Feb. 2002, XP002340298, http://www-03.ibm.com/servers/eserver/pseries/hardware/whitepapers/1par_security.pdf retrieved on Aug. 10, 2005.

Karger et al., "A VMM Security Kernel for the VAX Architecture", Proceedings of the Symposium on Research in Security and Privacy, Oakland, May 1990, Los Alamitos, IEEE Comp. Soc. Press, U.S., vol. Symp.11, pp. 2-19.

* cited by examiner

*Primary Examiner*—Nasser G Moazzami
*Assistant Examiner*—Eleni A Shiferaw
(74) *Attorney, Agent, or Firm*—Yee & Associates, P.C.; Diana R. Gerhardt

(57) ABSTRACT

A system and method to reduce external access to hypervisor interfaces in a computer system, thereby reducing the possibility of attacks. In a preferred embodiment, addresses for calls are used to fill a table, where the addresses are specifically selected for a requesting computer. For example, in one embodiment, a routine searches for the adapter type of a requesting computer and populates the table with calls specific to that type of adapter. Other types of calls are not put in the table. Instead, those calls are replaced by routines that will return an error. In other embodiments, the operating system type is used to determine what addresses are used to populate the table. These and other embodiments are explained more fully below.

11 Claims, 7 Drawing Sheets

100 DATA PROCESSING SYSTEM

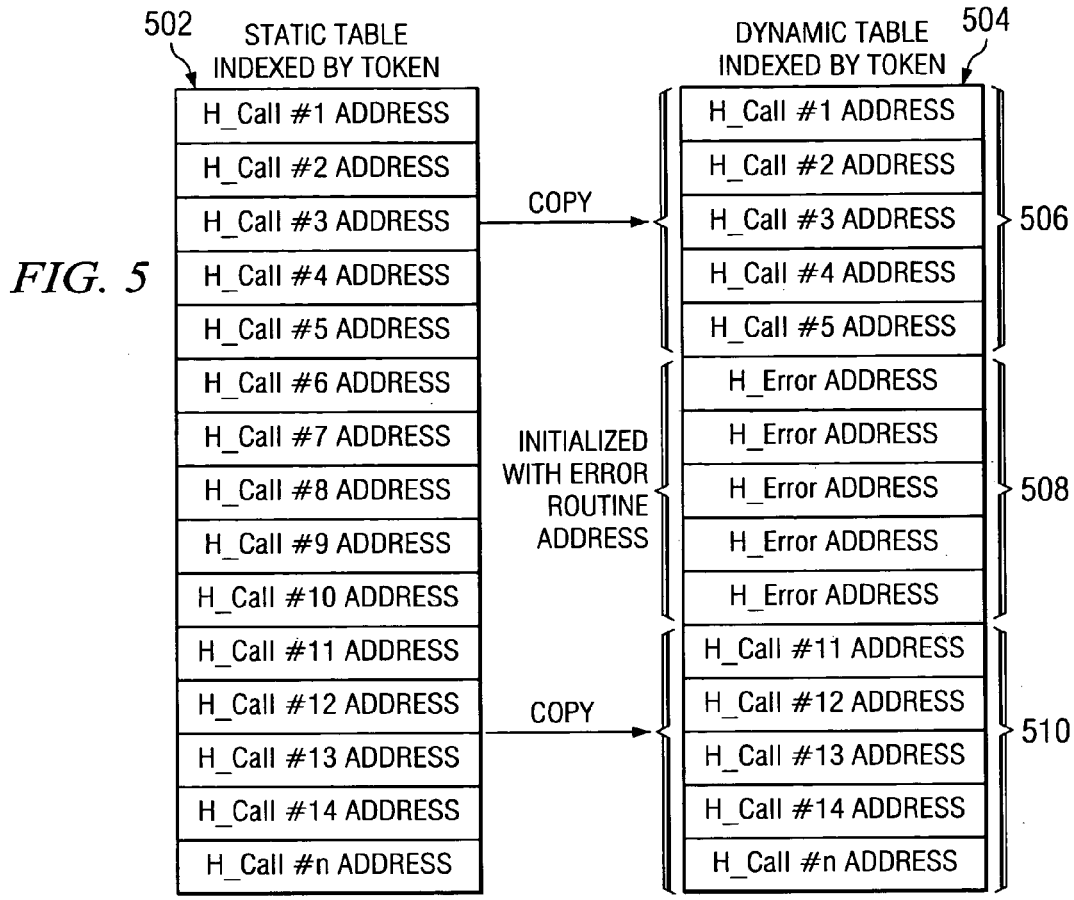
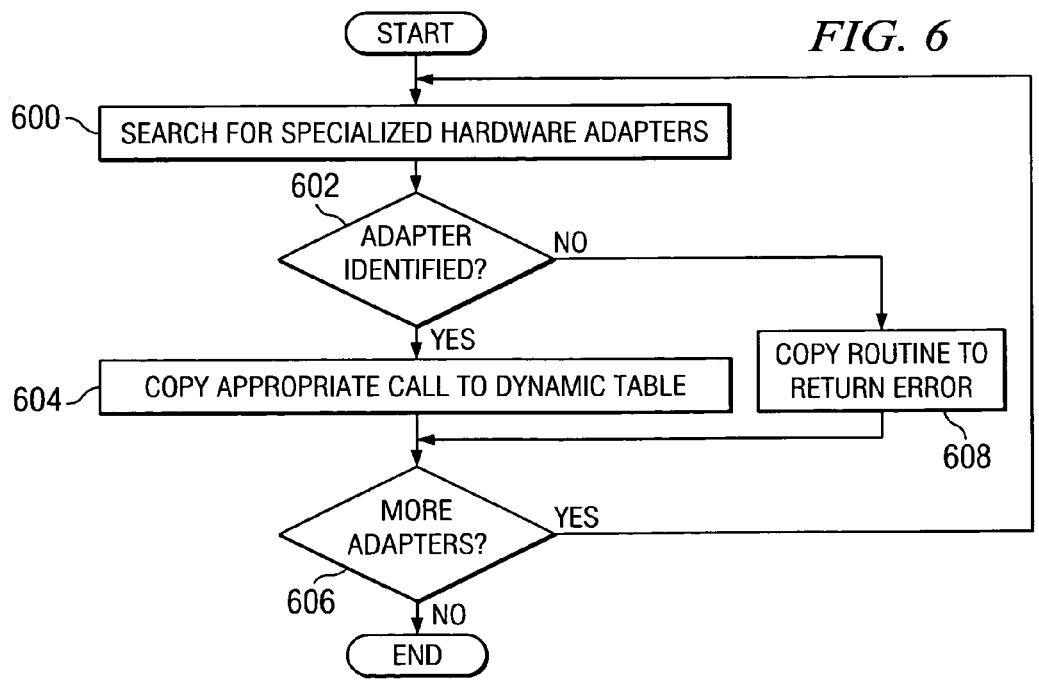

METHOD TO ENHANCE PLATFORM FIRMWARE SECURITY FOR LOGICAL PARTITION DATA PROCESSING SYSTEMS BY DYNAMIC RESTRICTION OF AVAILABLE EXTERNAL INTERFACES

BACKGROUND OF THE INVENTION

1. Technical Field

The present invention relates generally to security in a computer system, and particularly to limiting vulnerability to attacks on a partitioned computer system.

2. Description of Related Art

As security issues become a greater concern, the IT industry is undergoing a rapid transformation to enhance security in all aspects. Currently a number of nations have embraced the Common Criteria Evaluation methodologies, a rigorous and expensive methodology used to evaluate the security assurance level that a IT system possesses. This methodology encompasses all aspects of IT product development, ranging from building security where development activities take place, CM systems, development activities, and up to and including secure delivery of the product to prevent tampering. Currently the US government requires this evaluation to be completed for all IT equipment used in national security, critical infrastructure and Homeland Defense systems. Additionally the financial and healthcare industries are embracing these evaluations as part of the proposed requirements for their systems to be purchased.

Current hypervisor designs have exposed external interfaces to provide general services (non-hardware specific) to the operating systems loaded such as interrupt management, Page Table Entry (PTE) management, Translation Control Entry (TCE) management as well as specialized interfaces to handle specialized hardware resources such as Federation or InfiniBand (IB) adapters.

FIG. 3 shows a known system for platform firmware, such as Hypervisor. Hypervisor is available from International Business Machines Corporation. Hypervisor 302 includes Hypervisor I/F 304 which allows access to Hypervisor calls (H_calls) for various partitions 310, 312, 314. Depending on the particular adapter hardware, some calls are hardware dependent 308 while some calls are non-hardware dependent 306. All types of partitions are presented with both types of interface.

Currently International Business Machines is introducing the first of a converged hypervisor design that supports multiple different simultaneous operating systems on a single platform. In this hypervisor design, multiple operating systems are allowed to access all hypervisor calls, H_CALLS, through hypervisor interface. In the current design there are more than 350 hypervisor calls, some dedicated to RPA partitions (of the RS/6000 platform architecture), some dedicated to OS/400 partitions and some shared.

In the current product plans it is well understood that the majority of systems will only support RPA partitions because the industry is moving away from proprietary OSs like OS/400. The majority of delivered systems will only use AIX or Linux partitions and therefore the exposed hypervisor interfaces specific to OS/400 partitions represent vulnerable attack points that have no product value in RPA only systems. Conversely the customers needing OS/400 partitions most likely will not use RPA partitions at the same time, those customers using both RPA and non-RPA partitions on the same system is only a very small percentage of the overall market.

In the current systems only a few platforms support the Federation adapter and plans for the InfiniBand adapter are for a small percentage of system, however all platforms have hypervisor calls for these adapters exposed. In the p6xx series, from the p625, p630, p640, p650, p655, p670, and p690, only the p670 and p690 provide hardware support for the Federation adapters and only a very small percentage of p670 and p690 systems are shipped with the Federation adapters. These interfaces represent unused unnecessary attack points when the adapters are not installed.

An analysis of the security of a system shows that the exposed external interfaces are the attack points for external threats, increase the number of interfaces and vulnerability increases. Additionally analysis has shown and is well documented in many publications that there is approximately one security flaw in every KLOC (thousand lines of code) of delivered code.

According to an excerpt taken from the Trusted Computing Group's Backgrounder of May 2003:

A critical problem being addressed by creation and use of these specifications is the increasing threat of software attack due to a combination of increasingly sophisticated and automated attack tools, the rapid increase in the number of vulnerabilities being discovered, and the increasing mobility of users. The large number of vulnerabilities is due, in part, to the incredible complexity of modern systems. For example, a typical Unix or Windows system, including major applications, represents on the order of 100 million lines of code. Recent studies have shown that typical product level software has roughly one security related bug per thousand of lines of source code. Thus, a typical system will potentially have one hundred thousand security bugs.

Current plans for the POWER5 LPAR platform are to undergo a complete security evaluation to meet the EAL4+ Common Criteria requirements. In review of the previous platform evaluation, two critical areas are interpartition protection and access control between partitions. The exposure of additional unused interfaces represents a significant increase in vulnerability during the use of these systems as well as an increase in the testing efforts.

Current solutions to this problem is to include code in each and every H_CALL (hypervisor call) dedicated to the specialized hardware that looks for adapter presence and/or checks to see if the adapter has been initialized. This requires code in many routines as opposed to having a single immediate exit point.

Therefore, it would be advantageous to have an improved method and apparatus for enhancing access security to hypervisor calls by partitioned systems.

SUMMARY OF THE INVENTION

The present invention provides a method, apparatus, and computer instructions to reduce external access to partitions in a computer system, thereby reducing the possibility of attacks. In a preferred embodiment, addresses for calls are used to fill a table, where the addresses are specifically selected for a requesting computer. For example, in one embodiment, a routine searches for the adapter type of a requesting computer and populates the table with calls specific to that type of adapter. Other types of calls are not put in the table. Instead, those calls are replaced by routines that will return an error. In other embodiments, the operating system type is used to determine what addresses are used to populate the table. These and other embodiments are explained more fully below.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 shows a static table and a dynamic table where some of the dynamic table entries are filled with routines that return an error, consistent with a preferred embodiment of the present invention.

FIG. 6 shows a flowchart with process steps for implementing a preferred embodiment of the present invention.

DETAILED DESCRIPTION OF THE PREFERRED EMBODIMENT

Figure 1:
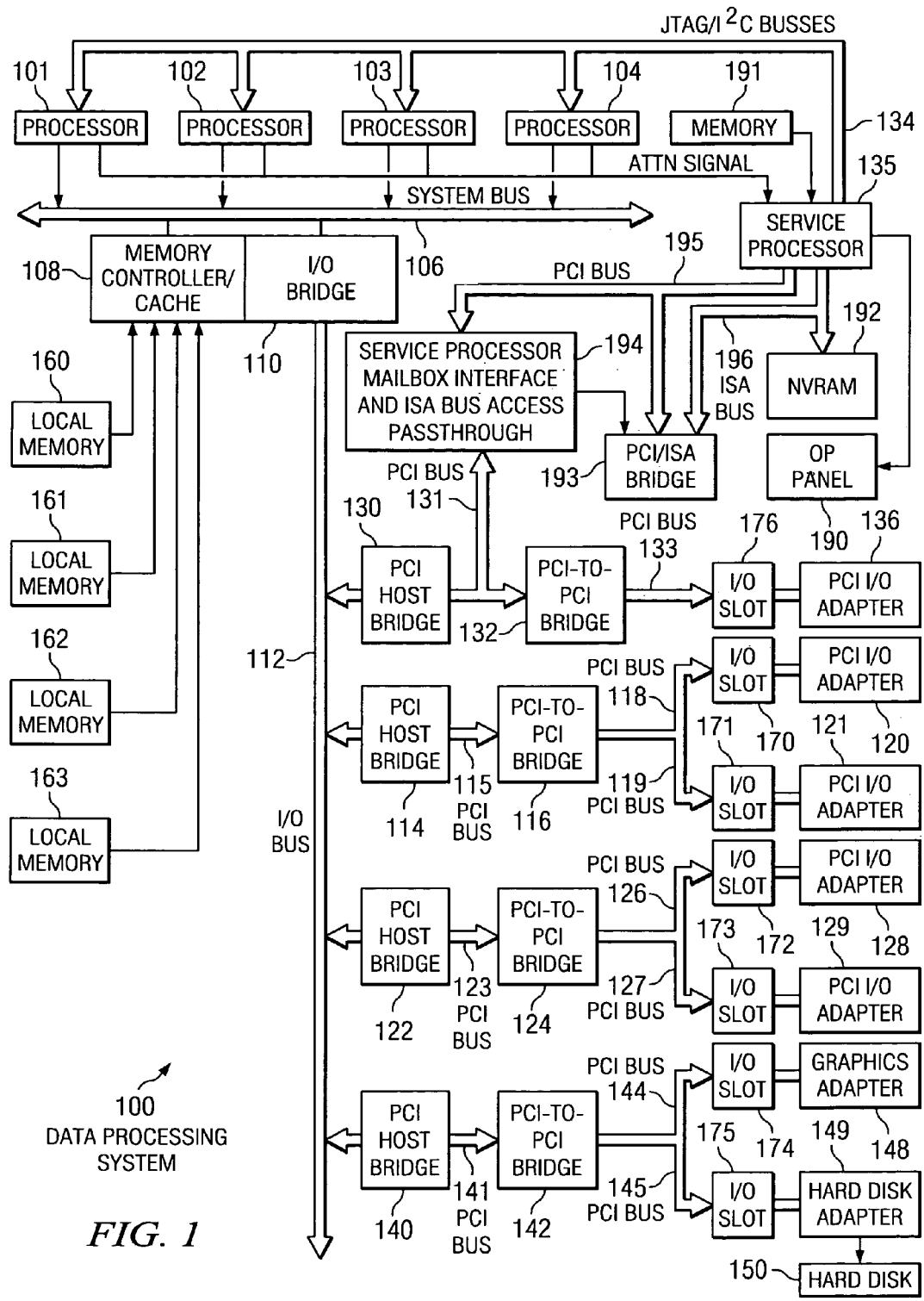
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128 129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTS, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
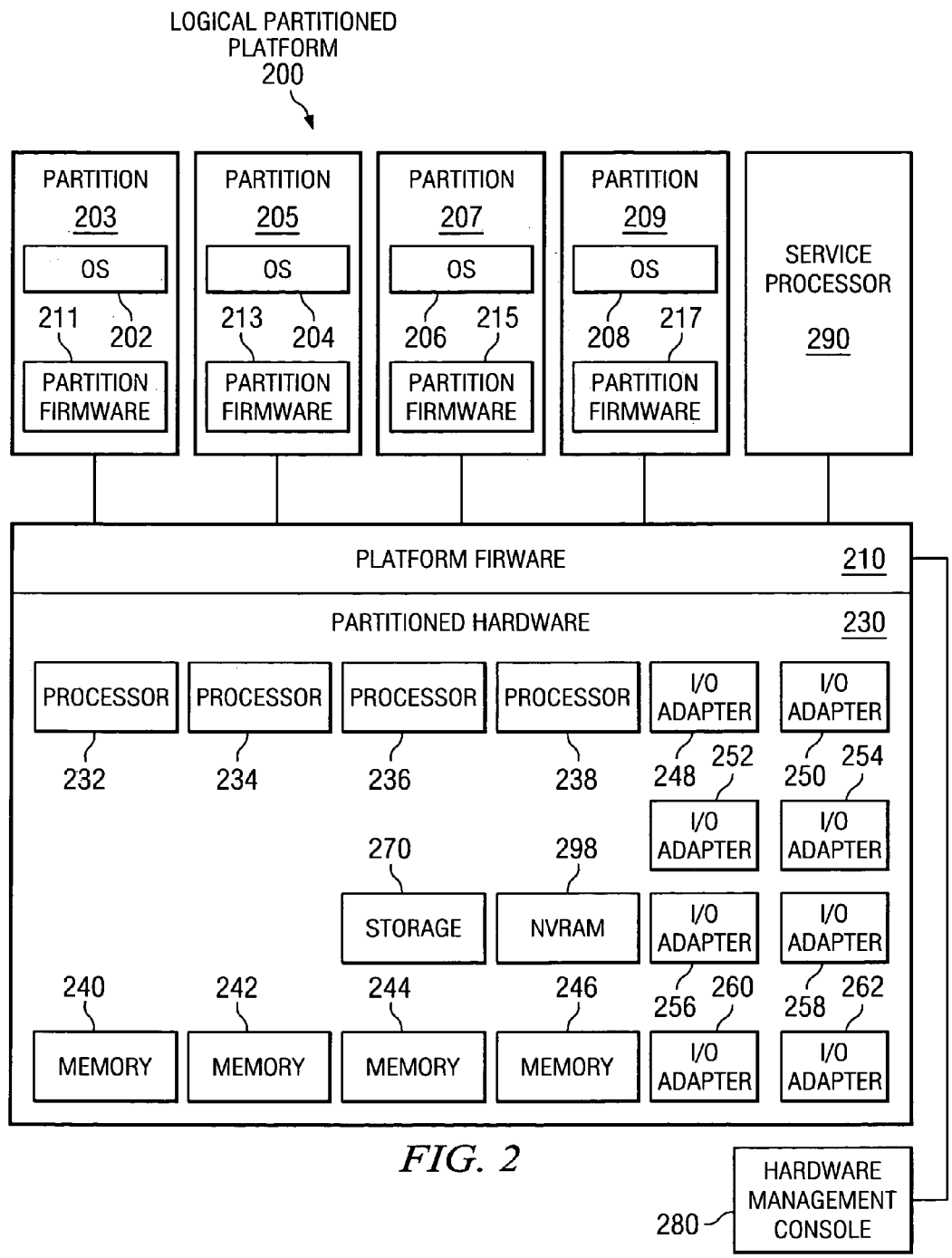
FIG. 2 is a block diagram of an exemplary logical partitioned platform in which the present invention may be implemented.
Figure 3:
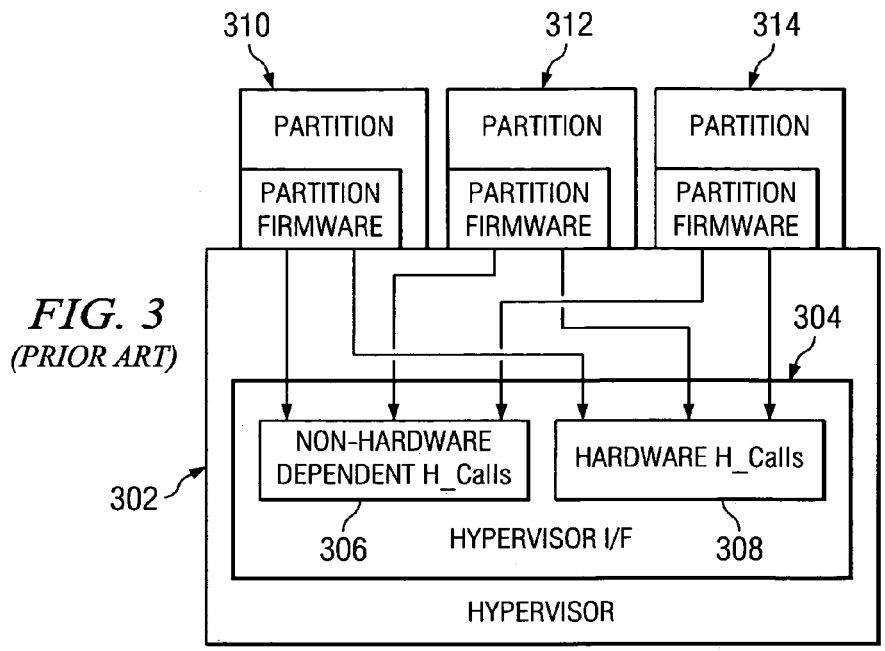
FIG. 3 shows a known partitioned data processing system with hypervisor where each partition can be accessed by each type of call.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209.

Hypervisor software is an example of software that may be used to implement platform (in this example, partition management) firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Platform firmware 210 performs a number of functions and services for partitions 203, 205, 207, and 209 to create and enforce the partitioning of logical partitioned platform 200. Platform firmware 210 is a firmware implemented virtual machine identical to the underlying hardware. Thus, platform firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Figure 4:
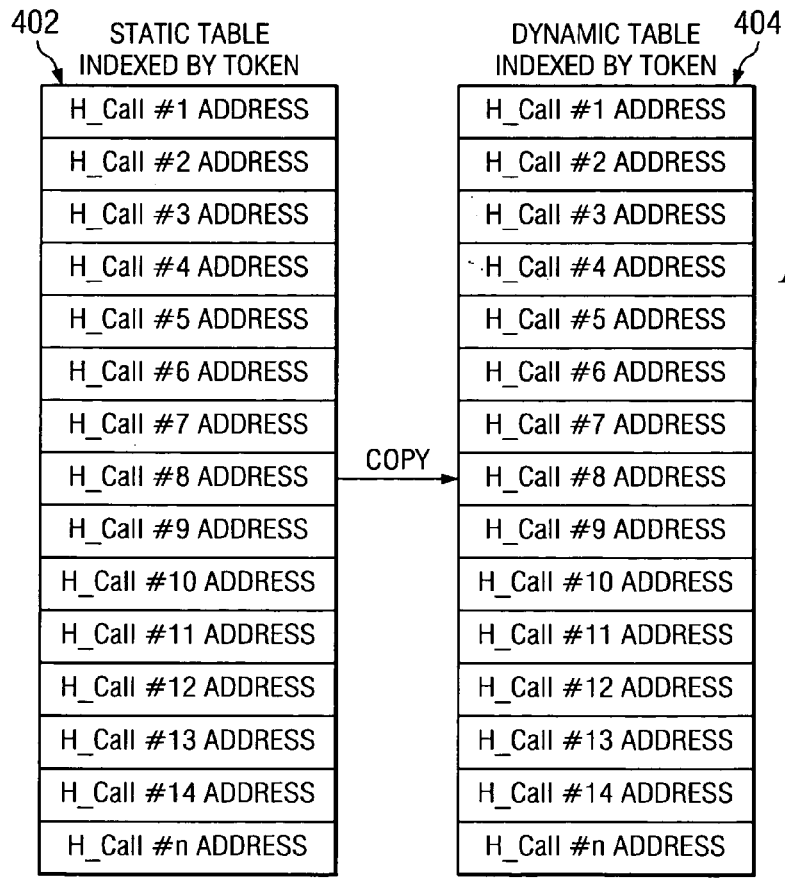
FIG. 4 shows a static table and a dynamic table for holding hypervisor call addresses consistent with a preferred embodiment of the present invention.

FIG. 4 shows a set of tables consistent with implementing a preferred embodiment of the present invention. In a first preferred embodiment, the present invention dynamically restricts the number of external hypervisor interfaces presented based on the presence of specialized hardware adapters installed in the requesting computer. By restricting access by an external computer to certain hypervisor calls, access to certain partitions behind the hypervisor is restricted.

In this example, static table 402 includes all H_call addresses. H_calls, or hypervisor calls, are services used by partition firmware. As RTAS instantiation (run time abstraction services) happens, all RTAS calls in SMP mode are routed to the hypervisor using H_calls. These calls are not exposed to the operating system and are subject to change at the convenience of the hypervisor and/or partition firmware. Examples of H_calls include h_get_xive, which is called by pSeries firmware to get the contents of the xive interrupt control register; and h_pci_config_read, which reads the PCI adapter configuration space, if the adapter is owned by the invoking partition.

Dynamic table 404 is used to copy those call addresses which should be available to the requesting computer, depending on the adapter type. In this example, the requesting computer is given access to all H_calls (and hence all partitions), so the dynamic table is populated with all the H_calls.

FIG. 5 shows a case where a requesting computer is not given access to all H_calls. Based on the requesting computer's adapter type (or other detectable hardware attribute), dynamic table 504 is populated with only certain ones 506, 510 of H_calls from table 502. Calls 508 are replaced with addresses that will return an error. Hence, the mechanism of the present invention limits the number of external interfaces without limiting needed capability to communicate for the various types of partitions and adapters.

Figure 7:
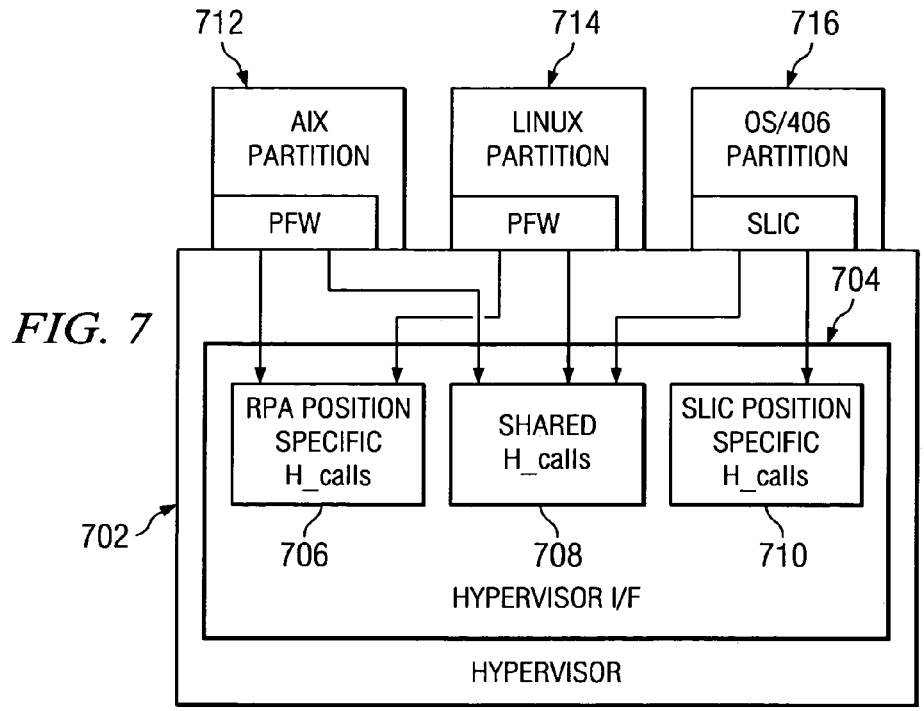
FIG. 7 shows a hypervisor and partitions for a computer system where all partitions are visible.

FIG. 7 shows a situation where the some of the partitions share hypervisor calls. In this example, Hypervisor 702 includes Hypervisor I/F 704 that makes available calls 706, 708, 710 for accessing various partitions 712, 714, 716. In this example, all partitions are exposed to external interfaces.

Figure 8:
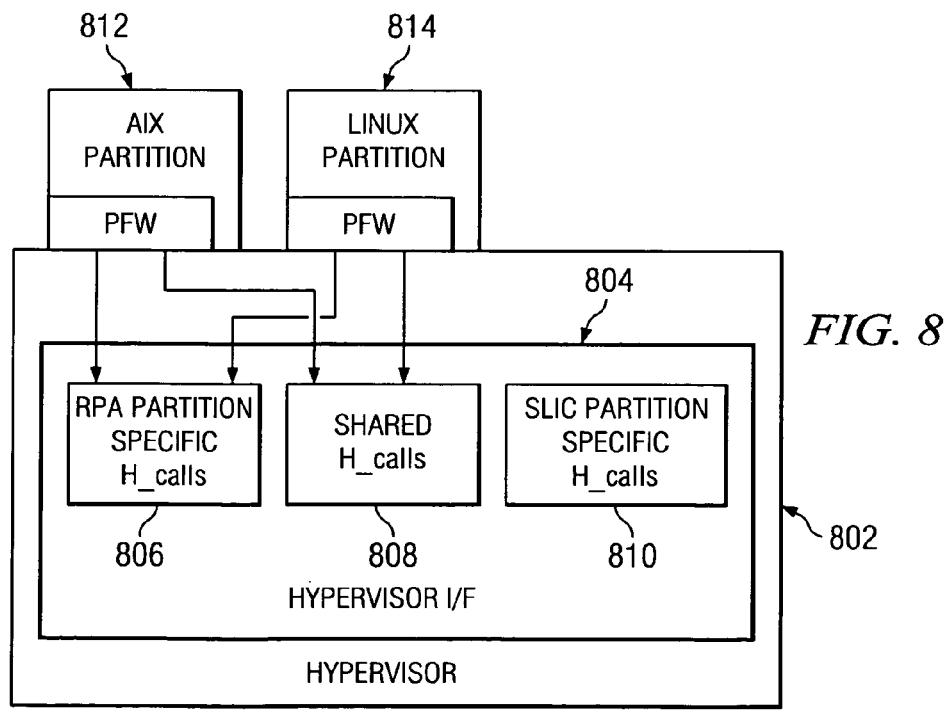
FIG. 8 shows a hypervisor and partitions where one partition is hidden from external calling, consistent with a preferred embodiment of the present invention.

FIG. 8 shows an illustrative embodiment the present invention implemented using restrictions to partitions based on the partition type instead of the adapter type. In this example, hypervisor 802 includes hypervisor I/F 804 and the various shared and partition specific calls 806, 808, 810. In this example, H_calls 810 are not available to a requesting computer, and therefore only partitions 812, 814 can be accessed by a requesting computer.

Figure 9:
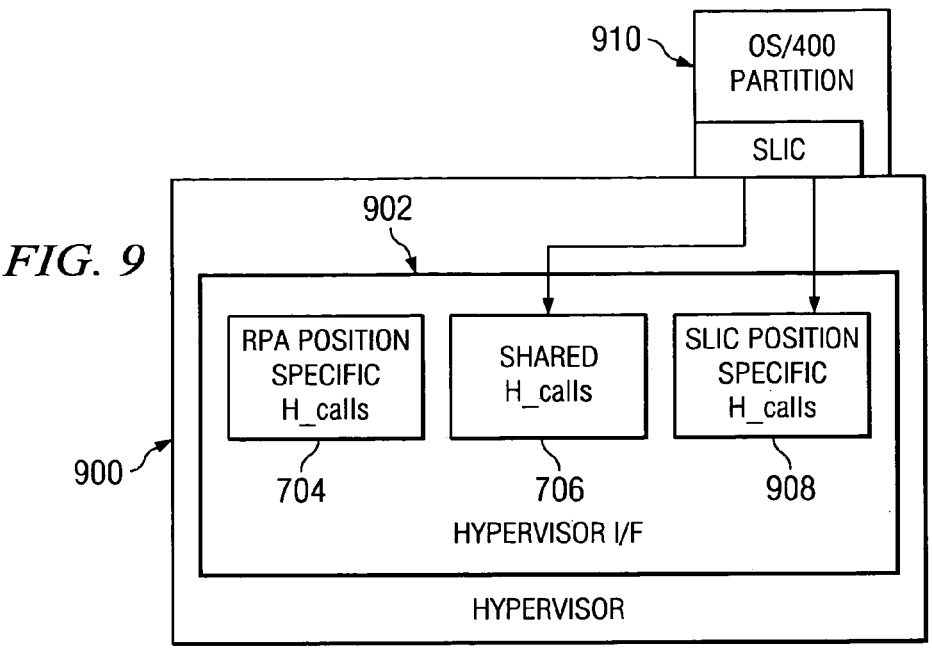
FIG. 9 shows a hypervisor and partitions where two partitions are hidden from external calling, consistent with a preferred embodiment of the present invention.

FIG. 9 complements FIG. 8 in that it shows the opposite case, namely access to only calls for partition 910 are accessible to an external computer or request. It is noted that in both FIGS. 8 and 9 that shared calls 906 are accessible, while the unnecessary partitions are hidden from an external computer.

Figure 10:
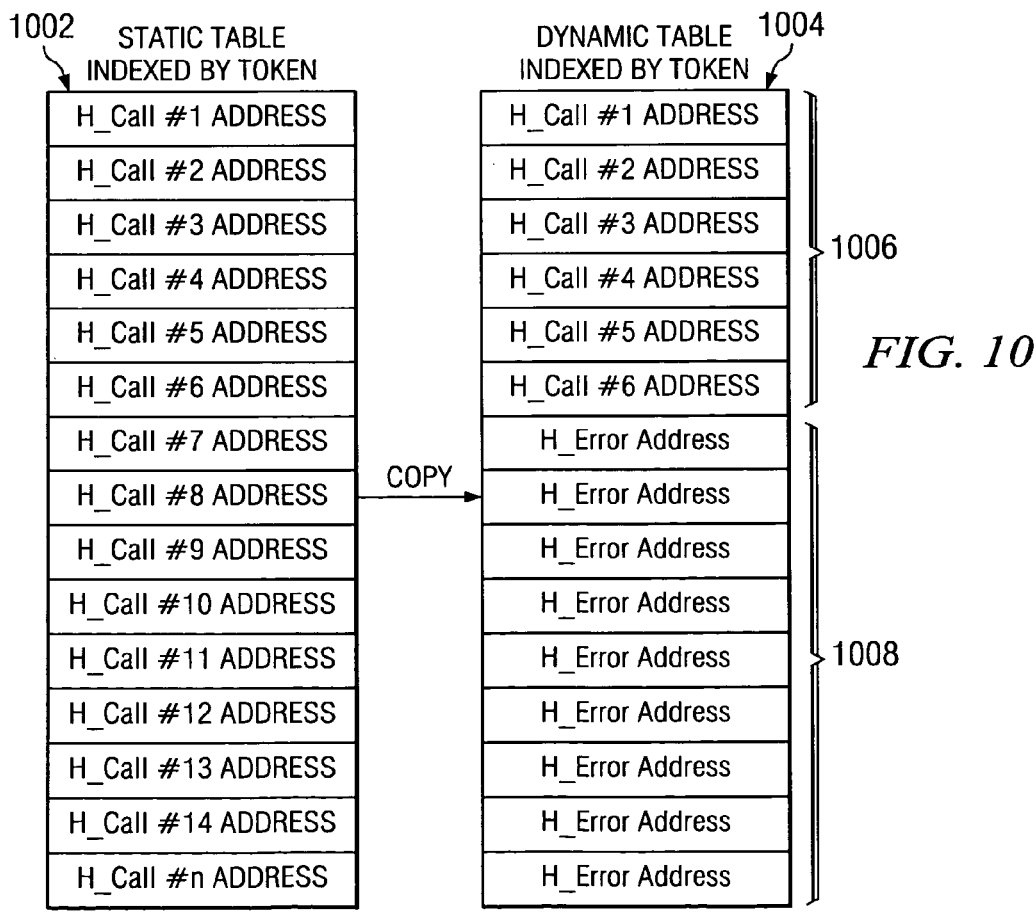
FIG. 10 shows static and dynamic tables consistent with implementing a preferred embodiment of the present invention.

FIG. 10 shows this situation in terms of static table 1002 and dynamic table 1004. Once the hypervisor discovers the type of operating system and partition to be communicated with, the relevant addresses for communicating with that partition are used to populate table 1004, giving access to those addresses for making H_calls to the relevant partition 910. The remaining cells of table 1004 are populated by addresses that will return an error.

Figure 11:
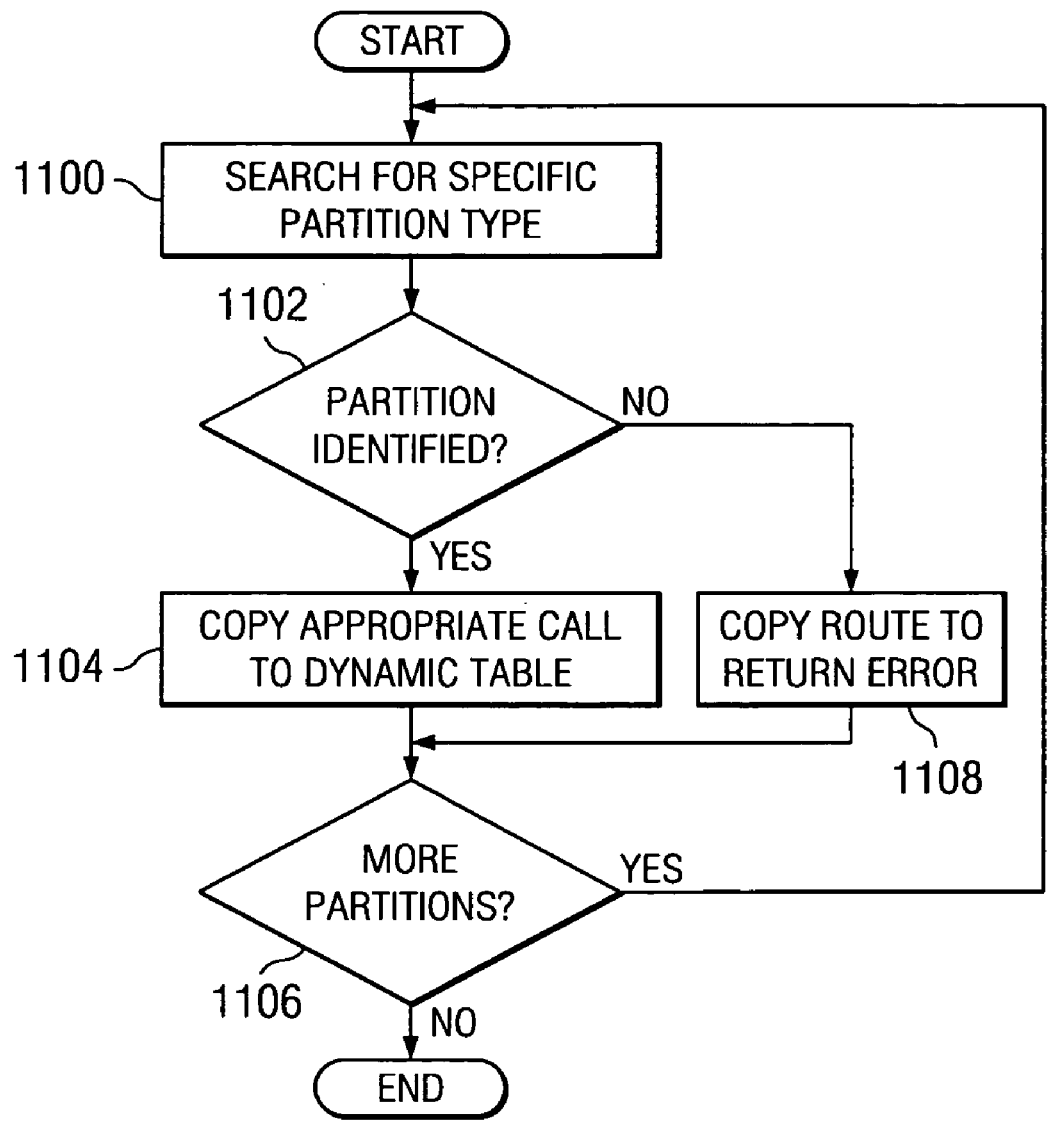
FIG. 11 shows a flowchart with process steps for implementing a preferred embodiment of the present invention.

FIGS. 6 and 11 depict flowcharts for implementing embodiments of the present invention. FIG. 6 shows the embodiment wherein the dynamic table is populated with addresses based on the type of hardware adapter used to communicate with the hypervisor and partitions. This process is preferably implemented in hypervisor 302 in conjunction with data processing system 100. The process begins with a search for specialized hardware adapters of the requesting computer (step 600). A determination is made as to whether the adapter is identified (step 602). If it is, then the appropriate calls for that adapter are copied from the static table to the dynamic table (step 604). If there are more adapters (step 606), then the process repeats. If the adapter is not identified, a routine to return an error is copied into the dynamic table.

FIG. 11 starts with a search to see if the requesting computer is requesting access to a particular operating system or partition type (step 1100). In preferred embodiments, this is done by reading the system's particular VPD (vital product data) type. If the partition is identified (step 1102) then the appropriate calls for that partition are copied into the dynamic table (step 1104). If more partitions are discovered (step 1106), then the process repeats. If the partition is not identified, then a routine to return an error is copied into the dynamic table (step 1108). This process is preferably implemented in hypervisor 302 in conjunction with data processing system 100.

In the illustrative embodiments, the requesting computer can make calls by the normal hypervisor interface. The hypervisor interface indexes the call to the dynamic table, for example, using a token, to identify the proper location in the dynamic table to find the address.

In other illustrative embodiments, the hypervisor only exposes the initialization call on startup. The initializing partition then makes the call to initialize, for example, the adapter, and the initialization H_call would expose all other relevant interfaces. This could be used in systems where the adapters may be installed but not used frequently. Then only the initialized H_call is exposed until the adapter is needed.

The present invention provides advantage over other systems in several ways, including low overhead to monitor the interfaces, and hiding unheeded H_calls from external interfaces, thereby limiting the avenues for outside attacks. Further, rather than adding code to each and every call, the present invention allows for a specific exit point which reduces overhead. The innovations herein are much safer in terms of exposed KLOCs, maintenance, and reduce the execution time in processing.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of restricting external interfaces of a computer system that includes a processor, comprising the computer implemented steps of:
    accessing, by the processor, a hypervisor partition management firmware using a plurality of hypervisor firmware calls, wherein the plurality of hypervisor firmware calls include all firmware calls that can be used to access the hypervisor partition management firmware;
    creating a dynamic table that includes a plurality of entries, wherein each one of the plurality of entries is associated with a different one of the plurality of hypervisor firmware calls, and wherein an entry exists in the plurality of entries that is associated with each one of the plurality of hypervisor firmware calls;
    searching a first computer for a specific attribute;
    populating the dynamic table with only ones of the plurality of hypervisor firmware calls that are associated with the specific attribute, wherein each one of the only ones of the plurality of hypervisor firmware calls is stored in one of the plurality of entries that is associated with said each one of said only ones of the plurality of hypervisor firmware calls;
    wherein ones of the plurality of entries of the table that are associated with ones of the plurality of hypervisor firmware calls that are not associated with the specific attribute are filled with routines that return an error, and wherein the table includes particular hypervisor firmware calls that are included in the plurality of hypervisor firmware calls and particular error routines; and
    wherein the specific attribute is an operating system type.

2. The method of claim 1, further comprising:
    storing an address of the only ones of the plurality of hypervisor firmware calls in one of the plurality of entries that is associated with said each one of said only ones of the plurality of hypervisor firmware calls; and
    wherein addresses that are stored in the table are used to communicate with a partition of the computer system.

3. The method of claim 1, wherein the computer system has multiple partitions, and wherein at least one partition is not accessible to the first computer.

4. The method according to claim 1, further comprising:
    creating a static table that includes a plurality of static entries, wherein each one of the plurality of static entries is associated with a different one of the plurality of hypervisor firmware calls, and wherein an entry exists in the plurality of static entries that is associated with each one of the plurality of hypervisor firmware calls; and
    populating the static table with each one of the plurality of hypervisor firmware calls, wherein each one of the plurality of hypervisor firmware calls is stored in one of the plurality of static entries that is associated with said each one of said plurality of hypervisor firmware calls.

5. The method according to claim 4, further comprising:
    in response to locating the specific attribute, populating the dynamic table by copying only ones of the plurality of hypervisor firmware calls that are associated with the specific attribute from the static table to the dynamic table.

6. A method in a logical partitioned data processing system for managing external interfaces, the method comprising:
    accessing a hypervisor partition management firmware using platform hypervisor firmware calls, wherein the platform hypervisor firmware calls include all firmware calls that can be used to access the hypervisor partition management firmware;
    providing a data structure for the platform hypervisor firmware calls, wherein the data structure is used to receive at least one of the platform hypervisor firmware calls from partitions within the logical partitioned data processing system;
    wherein the data structure includes a plurality of entries, wherein each one of the plurality of entries is associated with a different one of the platform hypervisor firmware calls, and wherein an entry exists in the plurality of entries that is associated with each one of the platform hypervisor firmware calls;
    populating the data structure with pointers to processes that are used to handle only ones of the platform hypervisor firmware calls that are associated with specific partitions, wherein a pointer to a process that is used to handle one of the only ones of the platform hypervisor firmware calls is stored in one of the plurality of entries that is associated with the one of the only ones of the platform hypervisor firmware calls;
    wherein ones of the plurality of entries of the data structure that are associated with ones of the platform hypervisor firmware calls that are not associated with the specific partitions are filled with pointers to routines that return an error, and wherein the data structure includes particular pointers to processes that are used to handle only ones of the platform hypervisor firmware calls that are associated with specific partitions and pointers to routines that return an error;
    wherein selected processes are made unavailable to calls from partitions other than the specific partitions;
    wherein the selected processes are for at least one of a process unavailable to a particular type of partition in the partitions and a process for hardware unavailable in the logical partitioned data processing system; and
    wherein the hardware is an adapter.

7. The method of claim 6, wherein the data structure is a table.

8. The method of claim 6, wherein the pointers are addresses to the processes.

9. The method according to claim 6, further comprising:
    creating a static table that includes a plurality of static entries, wherein each one of the plurality of static entries is associated with a different one of the platform hypervisor firmware calls, and wherein an entry exists in the plurality of static entries that is associated with each one of the platform hypervisor firmware calls; and
    populating the static table with each one of the platform hypervisor firmware calls, wherein each one of the platform hypervisor firmware calls is stored in one of the plurality of static entries that is associated with said each one of said platform hypervisor firmware calls.

10. The method according to claim 9, further comprising:
populating the data structure by copying only pointers to processes that are used to handle only ones of the platform hypervisor firmware calls that are associated with specific partitions from the static table to the data structure.

11. A method of restricting external interfaces of a computer system that includes a processor, comprising the computer implemented steps of:
accessing, by the processor, a hypervisor partition management firmware using a plurality of hypervisor firmware calls, wherein the plurality of hypervisor firmware calls include all firmware calls that can be used to access the hypervisor partition management firmware;

creating a dynamic table that includes a plurality of entries, wherein each one of the plurality of entries is associated with a different one of the plurality of hypervisor firmware calls, and wherein an entry exists in the plurality of entries that is associated with each one of the plurality of hypervisor firmware calls;

searching a first computer for a specific attribute;

populating the dynamic table with only ones of the plurality of hypervisor firmware calls that are associated with the specific attribute, wherein each one of the only ones of the plurality of hypervisor firmware calls is stored in one of the plurality of entries that is associated with said each one of said only ones of the plurality of hypervisor firmware calls;

wherein ones of the plurality of entries of the table that are associated with ones of the plurality of hypervisor firmware calls that are not associated with the specific attribute are filled with routines that return an error, and wherein the table includes particular hypervisor firmware calls that are included in the plurality of hypervisor firmware calls and particular error routines; and wherein the specific attribute is an adapter type.

* * * * *

UNITED STATES PATENT AND TRADEMARK OFFICE
CERTIFICATE OF CORRECTION

PATENT NO. : 7,577,991 B2
APPLICATION NO. : 10/897228
DATED : August 18, 2009
INVENTOR(S) : Huynh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1426 days.

Signed and Sealed this

Seventh Day of September, 2010

David J. Kappos
*Director of the United States Patent and Trademark Office*